United States Patent
Sazegari

(10) Patent No.: US 6,901,422 B1
(45) Date of Patent: May 31, 2005

(54) MATRIX MULTIPLICATION IN A VECTOR PROCESSING SYSTEM

(75) Inventor: Ali Sazegari, Cupertino, CA (US)

(73) Assignee: Apple Computer, Inc., Cupertino, CA (US)

( * ) Notice: Subject to any disclaimer, the term of this patent is extended or adjusted under 35 U.S.C. 154(b) by 838 days.

(21) Appl. No.: 09/812,578

(22) Filed: Mar. 21, 2001

(51) Int. Cl.[7] .............................................. G06F 17/16
(52) U.S. Cl. ...................................................... 708/607
(58) Field of Search ........................................ 708/607

(56) References Cited

U.S. PATENT DOCUMENTS

| | | |
|---|---|---|
| 3,859,515 A | 1/1975 | Radcliffe, Jr. |
| 4,128,880 A | 12/1978 | Cray, Jr. |
| 4,686,532 A | 8/1987 | McAulay |
| 4,791,598 A | 12/1988 | Liou et al. |
| 4,996,530 A | 2/1991 | Hilton |
| 5,009,448 A | 4/1991 | Kijima et al. |
| 5,014,235 A * | 5/1991 | Morton ........................ 708/520 |
| 5,021,987 A * | 6/1991 | Chan et al. ................... 708/607 |
| 5,025,407 A | 6/1991 | Gulley et al. |
| 5,091,721 A | 2/1992 | Hamori |
| 5,099,447 A * | 3/1992 | Myszewski ................... 708/607 |
| 5,148,385 A | 9/1992 | Frazier |
| 5,170,370 A | 12/1992 | Lee et al. |
| 5,226,002 A * | 7/1993 | Wu et al. ..................... 708/607 |
| 5,226,171 A | 7/1993 | Hall et al. |
| 5,276,826 A | 1/1994 | Rau et al. |
| 5,291,429 A * | 3/1994 | Iwama et al. ................ 708/402 |
| 5,319,586 A | 6/1994 | Gupta et al. |
| 5,321,639 A | 6/1994 | Krishnamoorthy et al. |
| 5,325,510 A | 6/1994 | Frazier |
| 5,420,809 A | 5/1995 | Read et al. |
| 5,442,581 A | 8/1995 | Poland |
| 5,465,224 A | 11/1995 | Guttag et al. |
| 5,481,746 A | 1/1996 | Schiffleger et al. |
| 5,541,914 A | 7/1996 | Krishnamoorthy et al. |
| 5,588,152 A | 12/1996 | Dapp et al. |
| 5,590,345 A | 12/1996 | Barker et al. |
| 5,600,843 A | 2/1997 | Kato et al. |
| 5,625,836 A | 4/1997 | Barker et al. |
| 5,685,008 A | 11/1997 | Pan et al. |
| 5,696,954 A | 12/1997 | Guttag et al. |
| 5,708,732 A | 1/1998 | Merhav et al. |
| 5,708,836 A | 1/1998 | Wilkinson et al. |
| 5,710,935 A | 1/1998 | Barker et al. |
| 5,713,037 A | 1/1998 | Wilkinson et al. |
| 5,717,943 A | 2/1998 | Barker et al. |
| 5,717,944 A | 2/1998 | Wilkinson et al. |
| 5,734,921 A | 3/1998 | Dapp et al. |
| 5,752,067 A | 5/1998 | Wilkinson et al. |
| 5,754,871 A | 5/1998 | Wilkinson et al. |
| 5,761,726 A | 6/1998 | Guttag et al. |
| 5,765,011 A | 6/1998 | Wilkinson et al. |
| 5,768,629 A | 6/1998 | Wise et al. |

(Continued)

Primary Examiner—D. H. Malzahn
(74) Attorney, Agent, or Firm—Burns, Doane, Swecker & Mathis, LLP

(57) ABSTRACT

The present invention is directed to a system and method for multiplication of matrices in a vector processing system. Partial products are obtained by dot multiplication of vector registers containing multiple copies of elements of a first matrix and vector registers containing values from rows of a second matrix. The dot products obtained from this dot multiplication are subsequently added to vector registers which make up a product matrix. In an embodiment of the present invention, each matrix may be divided into submatrices to facilitate the rapid and efficient multiplication of large matrices, which is done in parts by computing partial products of each submatrix. The matrix multiplication performed by the present invention avoids rounding errors as it is bit-by-bit compatible with conventional matrix multiplication methods.

18 Claims, 15 Drawing Sheets

U.S. PATENT DOCUMENTS

| | | |
|---|---|---|
| 5,771,391 A | 6/1998 | Lloyd et al. |
| 5,794,059 A | 8/1998 | Barker et al. |
| 5,805,913 A | 9/1998 | Guttag et al. |
| 5,822,606 A | 10/1998 | Morton |
| 5,825,677 A | 10/1998 | Agarwal et al. |
| 5,835,792 A | 11/1998 | Wise et al. |
| 5,842,031 A | 11/1998 | Barker et al. |
| 5,843,723 A | 12/1998 | Dubensky, Jr. et al. |
| 5,845,112 A | 12/1998 | Nguyen et al. |
| 5,848,286 A | 12/1998 | Schiffleger et al. |
| 5,860,086 A | 1/1999 | Crump et al. |
| 5,864,703 A | 1/1999 | van Hook et al. |
| 5,870,619 A | 2/1999 | Wilkinson et al. |
| 5,875,463 A | 2/1999 | Crump et al. |
| 5,878,241 A | 3/1999 | Wilkinson et al. |
| 5,880,736 A | 3/1999 | Peercy et al. |
| 5,884,089 A | 3/1999 | Orian et al. |
| 5,892,962 A | 4/1999 | Cloutier |
| 5,894,484 A | 4/1999 | Illes et al. |
| 5,905,666 A | 5/1999 | Hoffman et al. |
| 5,909,460 A | 6/1999 | Dent |
| 5,913,069 A | 6/1999 | Sugumar et al. |
| 5,923,862 A | 7/1999 | Nguyen et al. |
| 5,925,145 A | 7/1999 | Illes et al. |
| 6,055,556 A * | 4/2000 | Barak et al. ................ 708/607 |
| 6,414,978 B2 | 7/2002 | Bragin et al. |

\* cited by examiner

MATRIX MULTIPLICATION IN A VECTOR PROCESSING SYSTEM

FIELD OF THE INVENTION

The present invention is generally directed to matrix multiplication in a vector processing system. More particularly, the invention is directed to a method for facilitating rapid matrix multiplication in a vector processing system.

BACKGROUND OF INVENTION

Matrix multiplication is an essential part of many different computations within computer systems. For example, matrix multiplication is employed in such applications as two- and three-dimensional computer graphics, computer audio, computer speech and voice synthesizing, computer gaming applications, and computer video. Unfortunately, matrix multiplication operations, particularly those involving large or complex matrices, can be time-consuming to compute. In order to improve performance, therefore, applications may forego complex matrix operations, with a resulting loss of output quality. Hence, if a matrix multiplication operation can be carried out more quickly, better quality results can be produced by various applications using such an operation. For example, graphics can be more detailed and have higher resolution, and graphical processing can involve more complex filters and transitions between window states when faster matrix multiplication is employed. Likewise, audio applications can provide a fuller sound using a wider dynamic range when more complex matrix multiplication associated with producing such audio can be performed in a time-efficient manner. The same is true for speech processing, video gaming applications, and computer video, in that each of these applications benefit from a faster, more efficient matrix multiplication, which allows for a more realistic motion video with higher resolution and faster frame refresh rates.

To this end, it is desirable to be able to perform matrix multiplication in a vector processing system, where an operation can be performed on multiple elements of a matrix with a single instruction. Such a system offers the potential for increased throughput, relative to a scalar processing system in which operation can only be carried out on one element of a matrix at a time. One problem commonly associated with matrix multiplication in a vector processing system, however, is that one of the matrices being multiplied must be transposed. This is due to the manner in which the elements of a matrix must be stored in a data register before a vector operation can be performed. The need to perform such a transposition can require numerous clock cycles, thereby reducing efficiency. A scalar processor is often implemented to perform matrix transposition associated with matrix multiplication. Changing between vector processing and scalar processing engines requires additional numerous clock cycles, and is inefficient compared to processing exclusively within a vector processing system.

Such delays associated with transposing matrices, or with switching between vector processing and scalar processing engines, are exacerbated when large matrices having high dimensions are involved. For example, matrix multiplication of 16×16 matrices each having 16 rows and 16 columns becomes vastly inefficient when performing scalar processing, or when requiring transposition before multiplication. However, many of the aforementioned applications which use matrix multiplication require multiplication of matrices much larger than this. The inefficiencies associated with handling of matrix multiplication by a scalar processor, or transposition of matrices, become greater as the matrix size increases.

Another problem with performing matrix operations in vector processing systems is that rounding errors may be introduced from changes in the order of operations in manipulating the matrix. Such rounding errors are problematic when floating point calculations are carried out and disparities between calculations having different orders of operations become a factor. For example, if a precision is predetermined, and a calculation is carried out in different sequences, it may be possible that a value used in a later calculation is truncated, thereby yielding a thereby yielding a result that varies from a calculation that is carried out on the same two matrices but in a different sequence, or order.

Therefore, it is desirable that a method and system for performing efficient matrix multiplication be devised. It is further desirable that such a system and method for efficient matrix multiplication be suited for performing such tasks within a vector processing system. In this manner, the vector processing system's capabilities may be used in an advantageous manner, thereby increasing the speed and efficiency with which matrices can be multiplied in connection with various computer applications, allowing for improved performance and speed of those applications. It is also desirable that a method and system be devised for matrix multiplication in a manner that is bit-by-bit compatible with the traditional method of matrix multiplication using matrix transposition and/or scalar processing, to prevent discrepancies introduced by inconsistent rounding or changes in order of operations.

SUMMARY OF THE INVENTION

Accordingly, it is an object of the present invention to provide a system and method for efficient and rapid matrix multiplication in a vector processing computer system.

In accordance with an embodiment of the present invention, a system and method efficiently performs matrix multiplication in a vector processing computer system by using partial products. The invention provides means for storing in first vector registers within a vector processing system, multiple copies of each value of a first matrix, and storing in second vector registers within a vector processing system, values from each row of a second matrix. Upon storing the values in these first and second vector registers, the present invention dot multiplies each of the first vector registers having multiple copies of each value associated with a first row of the first matrix by each of the second vector registers. The dot product values obtained by this dot multiplication are each added to values in vector registers comprising a product matrix, and the multiplication and addition is again repeated for the first vector registers having values from every row of the first matrix. This method is bit-by-bit compatible with the traditional matrix multiplication, and does not introduce any discrepancies in rounding or otherwise which often occur because of changes in the order of operations.

In accordance with another embodiment of the present invention, a system and method for performing matrix multiplication in a vector processing system using partial products is provided, wherein each matrix being multiplied is divided into submatrices. The partial products obtained by multiplying each submatrix in a first matrix by each submatrix within a second matrix are added to registers making up a product matrix to form an overall product of the two matrices.

The present invention takes advantage of a vector processor's ability to perform calculations upon entire vector registers simultaneously, thereby greatly increasing the speed with which calculations may be performed, while still maintaining bit-by-bit compatability with conventional methods of matrix multiplication.

Further features of the invention, and the advantages offered thereby are explained in greater detail hereinafter with reference to specific embodiments illustrated in the accompanying drawings.

DETAILED DESCRIPTION OF THE PREFERRED EMBODIMENTS

In the following description, for the purpose of explanation and not limitation, certain details are set forth, such as particular techniques, steps, and system components in order to provide a thorough understanding of the present invention. However, it will be apparent to those skilled in the art that the present invention may be practiced in other embodiments that depart from these details. In some instances, specific detailed descriptions of well-known concepts and methods have been omitted so as not to obscure the description of the present invention. The present invention can find utility in a variety of computer configurations, as will become apparent from an understanding of the principles which underscore the invention.

Figure 1:
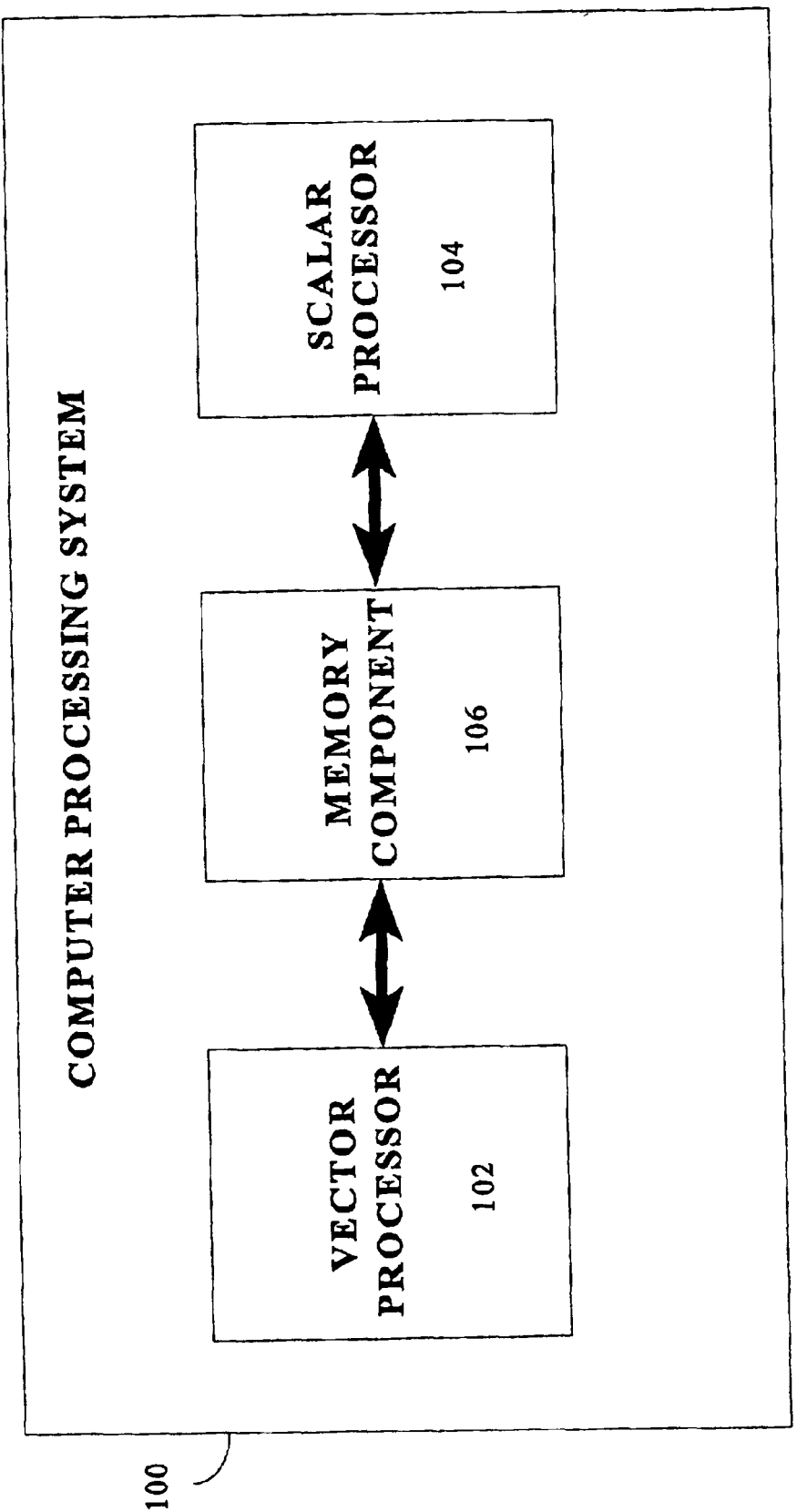
FIG. 1 shows a general computer processing system on which the present invention may be implemented.

An exemplary computer processing system of the type in which the present invention can be employed is illustrated in block diagram form in FIG. 1. The structure of the processing system itself does not form part of the present invention. It is briefly described here for subsequent understanding of the manner in which the features of the invention cooperate with the structure of the computer processing system.

Referring to FIG. 1, a general computer processing system 100 is illustrated, in which the computer processing system makes use of two individual processing components, a vector processor 102 and a scalar processor 104. The vector processor 102, which may comprise a vector floating point engine, for example, is used to increase computation speed by performing vector calculations, thereby decreasing the time needed to perform computations and calculations. The vector processor 102 increases the speed with which calculations may be performed by performing operations on multiple values in registers with a single operation typically during a single clock cycle. In systems that make use of vector processors, there is often also a need for a scalar processor 104, which may comprise a scalar engine, for example. The scalar processor is used in instances when it is not efficient or possible to perform calculations using the vector processor. Some of these instances might include times when specific, single-digit calculations are performed, or when there is no need to perform multiple calculations on multiple vector register elements at the same time. As illustrated in FIG. 1, memory 106 is used by both the vector processor 102 and the scalar processor 104, as indicated by the bi-directional arrows between the processors 102, 104, and the memory component 106. By way of this memory 106, both the vector processor 102 and the scalar processor 104 may communicate with one another and pass data between each other.

In instances involving matrix calculations it is generally more efficient and faster to handle all operations on matrix rows using the vector processor 102 than using the scalar processor 104 because these rows are generally stored as vector registers, permitting the vector processor 102 to operate on an entire row at one time. This allows for great reductions in processing time for each matrix calculation because using a vector processor 102 reduces the number of calculations for an entire matrix to the number of rows of the matrix rather than performing calculations on each individual element of the each register by the scalar processor. Also, when all calculations associated with matrix rows can be handled within the vector processor 102, there is no need to transfer the information contained within the registers from the vector processor 102 to the scalar processor 104. Thus, overall computation time is reduced because no additional time is required to transfer a register of data between the vector processor 102 and the scalar processor 104, which requires each element of the register to be transmitted individually to memory 106 and stored, and then subsequently retrieved.

Figure 2:
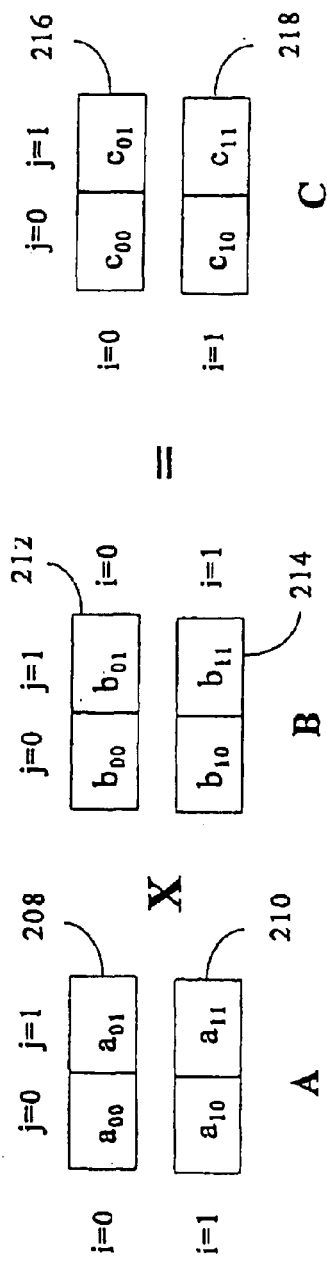
FIG. 2 is an illustration of vector registers used to perform matrix multiplication.

To facilitate an understanding of the invention, matrix multiplication in general will first be described, with particular reference to the manner in which it is carried out in a processor. FIG. 2 illustrates vector registers which store the values of the elements of two matrices, matrix A and matrix B, that are multiplied to form the product matrix, matrix C. In FIG. 2, each of the matrices to be multiplied together, matrix A and matrix B, is a 2×2 matrix, and the product matrix C, is also a 2×2 matrix. Each row of the matrices is stored as a vector in a computer register. It will be understood by those skilled in the art that the principles discussed in connection with matrix multiplication apply to matrices of other sizes that may have an unequal number of rows and columns, and that for the purposes of illustration, small matrices are used to facilitate understanding. An exemplary register size is 128 bits, which would hold four 32-bit floating point numbers. Thus, both rows of each matrix shown in FIG. 1, if comprised of 32-bit floating point numbers, could be stored in a single vector register. Alternatively, two 64-bit floating point numbers would require an entire vector register.

Each of the elements contained within the various matrices is represented by a lower case letter corresponding to the matrix identifier, and two subscript indices i and j corresponding to the row and column numbers, respectively. For example, matrix A contains elements $a_{00}$, $a_{01}$, $a_{10}$ and $a_{11}$. The values of the elements of each of the matrices are contained within vector registers. In FIG. 2, these vector registers correspond to the rows of each matrix. For example, matrix A is stored in two vector registers 208, 210. The first vector register 208 contains values from the first row (i=0) of matrix A; specifically, elements $a_{00}$ and $a_{01}$. The second vector register 210 contains values from the second row of matrix A (i=1); specifically, elements $a_{10}$ and $a_{11}$. Likewise, matrix B and matrix C are each stored in vector registers 212, 214, and 216, 218, respectively which contain values of the elements of each row of these matrices.

The manner by which the values of the product matrix C are determined is given by the formula shown below in Equation 1.

$$c_{ij} = \sum_{m=0}^{n} a_{im} b_{mj} \qquad \text{Equation 1}$$

In Equation 1, each value of the matrix C, $c_{ij}$, is calculated by summing the products of individual elements from matrix A and matrix B in the manner shown. In Equation 1, i corresponds to the row number of the matrix, and j corresponds to the column of the matrix. The variable m is used as an index, which is varied between 0 and the value n, where n is the total number of elements in a row of matrix A or column of matrix B. It will be recognized by those skilled in the art that Equation 1 may be used for matrices having differing numbers of rows and columns. However, as previously mentioned, for the sake of simplicity, matrices having an equivalent number of rows and columns have been used as examples.

In essence, Equation 1 indicates that the value of each element of matrix C is calculated by multiplying each element of one row of matrix A, which corresponds to the row of the element in matrix C being calculated, by each element of one column of matrix B, which corresponds to the column of the element in matrix C being calculated, and then summing the products obtained. In other words, the value of each element of matrix C located at row i and column j of matrix C is obtained by computing the dot product of row i of matrix A and column j of matrix B and summing the results. This presents an inefficiency in vector processing computer systems, however, as it is not possible to efficiently multiply row i of matrix A, which is stored in a single register, by column j of matrix B, whose elements' values are stored in multiple registers, since it requires multiple instructions. More particularly, the computing efficiencies that are provided by a vector processor lie in its ability to multiply and sum each of the values stored in one register with each of the corresponding values stored in another register at one time, i.e., with a single instruction. However, if the values stored in one register are to be multiplied with values stored in multiple registers, such as each of two registers 212 and 214 in FIG. 2, two separate instructions, and hence two separate processing cycles, must be used to complete the necessary operations. As a result, the overall process becomes less efficient. Therefore, to utilize the vector processor most effectively for matrix multiplication, it is desirable to have the values of all of the elements in one column of the second matrix B stored in a single vector register.

Figure 3:
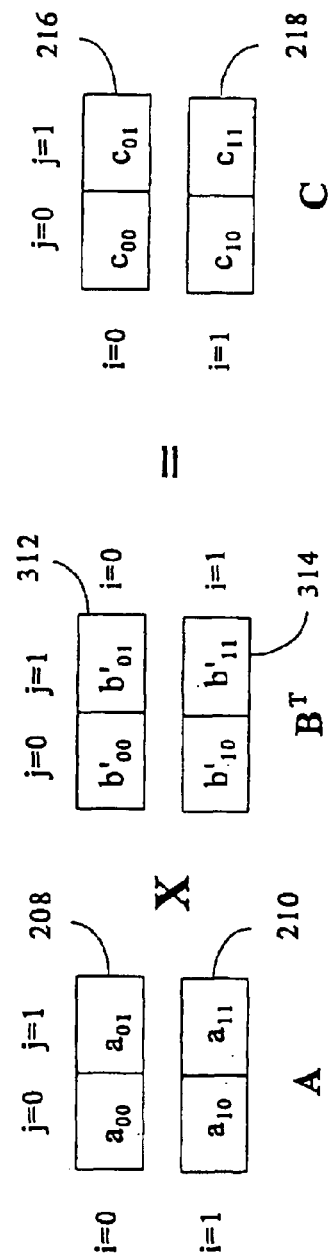
FIG. 3 is an illustration of vector registers used to perform matrix multiplication in a conventional manner.

To achieve this result in the past, matrix multiplication techniques in a vector processing system transposed one of the matrices to be multiplied, producing a matrix transpose. Such an example is illustrated in FIG. 3, wherein matrix A is shown having the same elements, the values of which are stored within the same vector registers 208, 210 as shown in FIG. 2. The values of the elements of the matrix $B^T$ are shown as stored in vector registers 312, 314. The values of the elements of the product matrix, matrix C, are stored in vector registers 216 and 218, which are the same as those shown in FIG. 2.

Matrix $B^T$ is used to facilitate efficient matrix multiplication according to the foregoing objective, and is obtained by re-arranging the matrix elements such that the elements of matrix B are placed in matrix locations so that their indices are reversed. That is, the value $b_{ij}$ which is the value of an element of matrix B of FIG. 2 in row i and column j, is placed in matrix $B^T$ in row j and column i. Elements in the Matrix $B^T$ have been marked with a prime to avoid confusion with the elements of Matrix B in FIG. 2. Thus, element $b'_{10}=b_{01}$ is placed in row 1 and column 0, and so forth. This transposition of data facilitates matrix multiplication in a vector processing system, as the various vector registers may be multiplied together to obtain a dot product, the elements of which can then be summed in a single step, rather than requiring calculations and manipulation of each element contained in multiple registers. In many vector processing systems, this may be accomplished by using a "fused" multiply-add function that multiplies corresponding elements of separate registers and adds the results with one instruction, requiring only a single clock cycle.

The main drawback associated with the approach illustrated in FIG. 3 is that multiple clock cycles must be used to transpose matrix B of FIG. 2 to form matrix $B^T$ of FIG. 3. In some systems, additional time may be lost due to the need to employ the use of a scalar processor for the transposition of matrices and manipulation of elements. A switch from vector processing to scalar processing requires additional time for saving all of the values held within the vector processor 102 to the memory 106 and the scalar processor 104 retrieving them from memory. The results of processing performed by the scalar processor must be saved to memory 106 to allow the vector processor to retrieve them when it is again employed. Such a process requiring multiple memory read or write commands uses numerous clock cycles, slowing overall processing.

Figure 4:
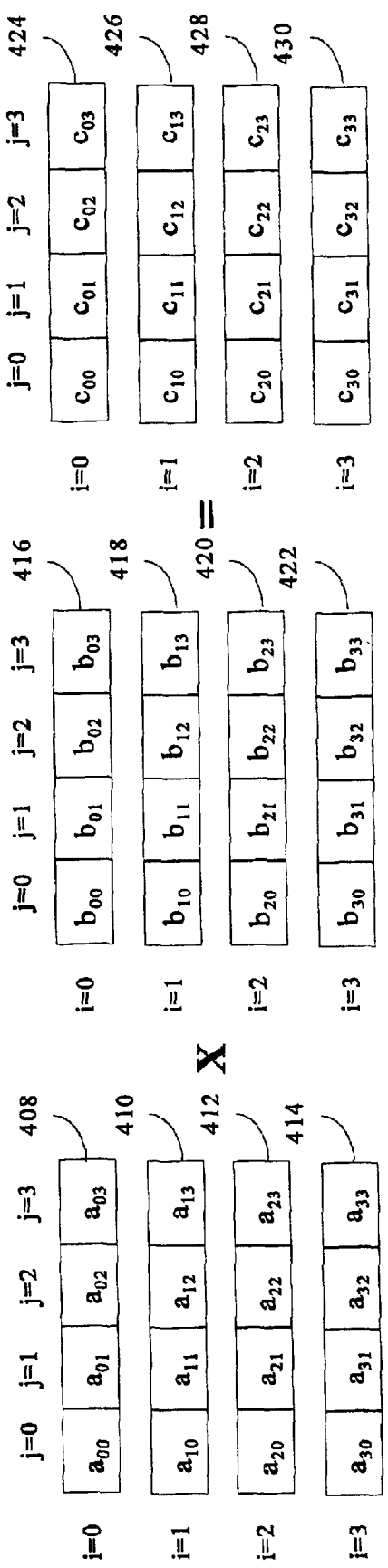
FIG. 4 is an illustration of vector registers used to perform matrix multiplication.

FIG. 4 illustrates the multiplication of matrix D and matrix E to form a product matrix, matrix F. Each of these matrices is a 4×4 matrix stored in four vector registers corresponding to matrix rows. In determining the values of matrix F, Equation 1 may be employed. However, it will be readily appreciated that the complexity in calculating each element of matrix F is much greater than the complexity associated with performing the same calculation using 2×2 matrices, such as those shown in FIG. 2, for example. It will also be appreciated that the complexity in obtaining the transpose of matrix E is much greater as well. The values of the elements in each matrix is stored in multiple vector registers. The values of the elements matrix D are stored in vector registers 408, 410, 412, 414, which correspond to each row of matrix D. The values of the elements of matrix E are stored in multiple vector registers 416, 418, 420, 422, which correspond to the individual rows of matrix E. Additionally, the values of the elements of matrix F are stored in multiple vector registers 424, 426, 428, 430, which each correspond to a row of matrix F.

Figure 5:
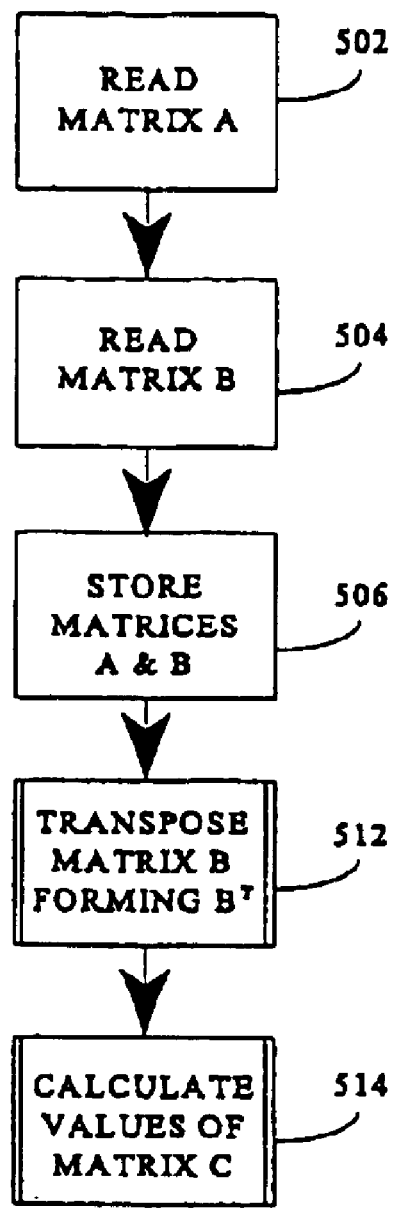
FIG. 5 is a flow diagram illustrating steps associated with conventional matrix multiplication.

FIG. 5 is a flow diagram illustrating the steps associated with the conventional multiplication of matrices, which apply to matrices such as the ones shown in FIGS. 2 and 4, for example, wherein a first matrix is multiplied by the transpose of the second matrix, and the dot products of the vector registers are summed.

In step 502 of FIG. 5, the registers containing the values of matrix A are read by the processor. The registers containing the values of matrix B are read by the processor in step 504, and both matrices are stored in vector registers in step 506. Matrix B is then transposed to form matrix $B^T$ in step 512. Once the matrix $B^T$ has been obtained, the values of matrix C are calculated in step 514 by computing the dot products of the various vector registers and summing these dot products, as discussed in connection with FIG. 3, to obtain the same result obtained using the formula shown in Equation 1.

Figure 6:
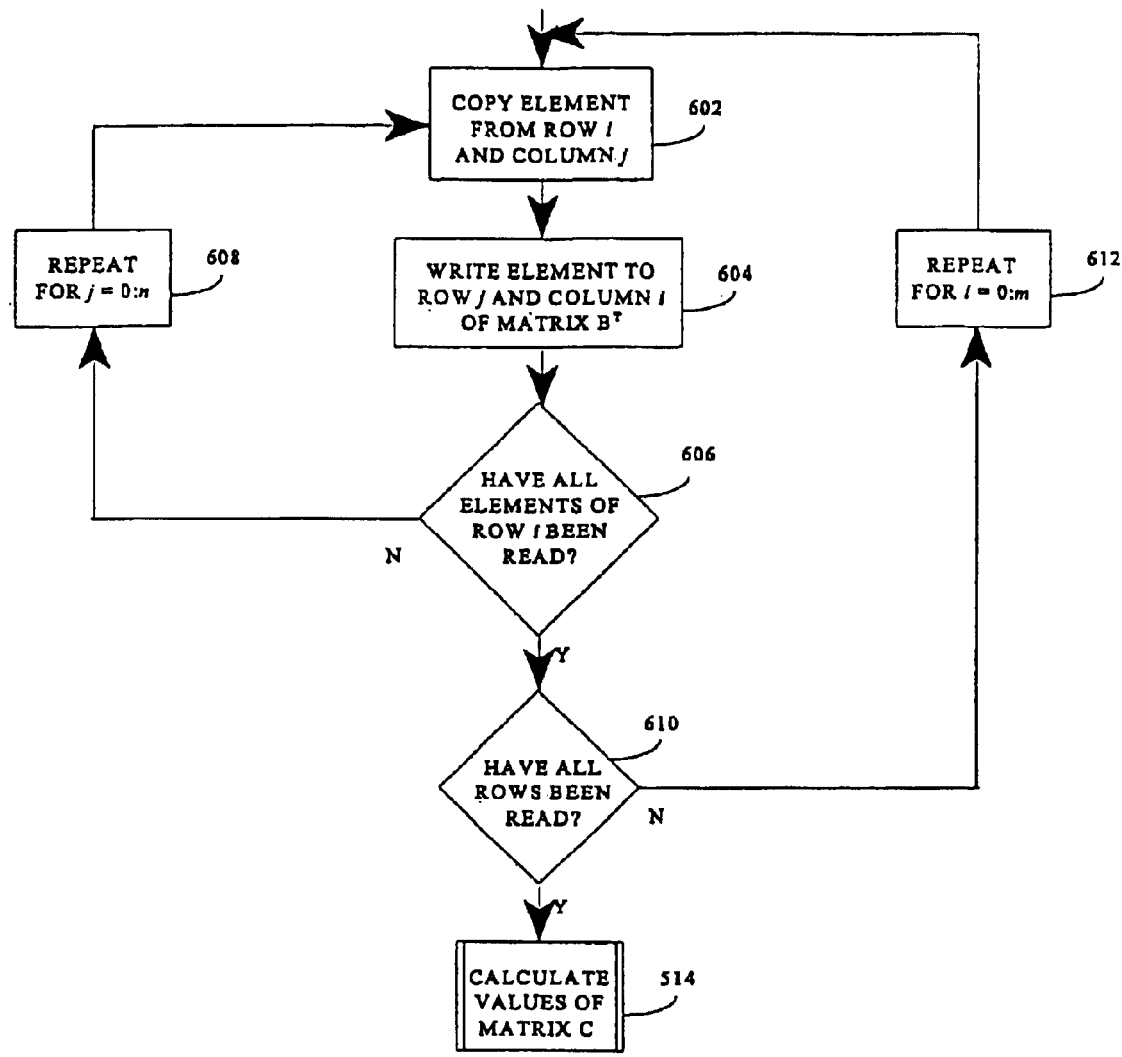
FIG. 6 is a flow diagram illustrating steps associated with conventional matrix multiplication.

In FIG. 6, the subroutine whereby martix B is transposed to form matrix $B^T$ in step 512 of FIG. 5 is illustrated. In FIG. 6, an element is copied from row i and column j of matrix B in step 602 and is written to row j and column i of the transposed matrix $B^T$ in step 604. A decision is made in step 606 whether all of the elements in row i have been read. If all of the elements in row i have not been read, then in step 608, an indication to repeat the previous two steps, steps 602 and 604, is given for each column of matrix B, for all values of j from 0 to n.

If, however, all of the elements in row i have been read at step 606, then a determination is made in step 610 as to whether all rows have been read. If all of the rows have not been read, then all of the previous steps 602, 604, and 606 are repeated for all of the rows having values of i from 0 to m, where m indicates the number of total rows, as described in step 612. If, however, at step 610 it is determined that all rows have been read, then processing is complete and the values of matrix C are calculated, as illustrated in step 514.

Figure 7:
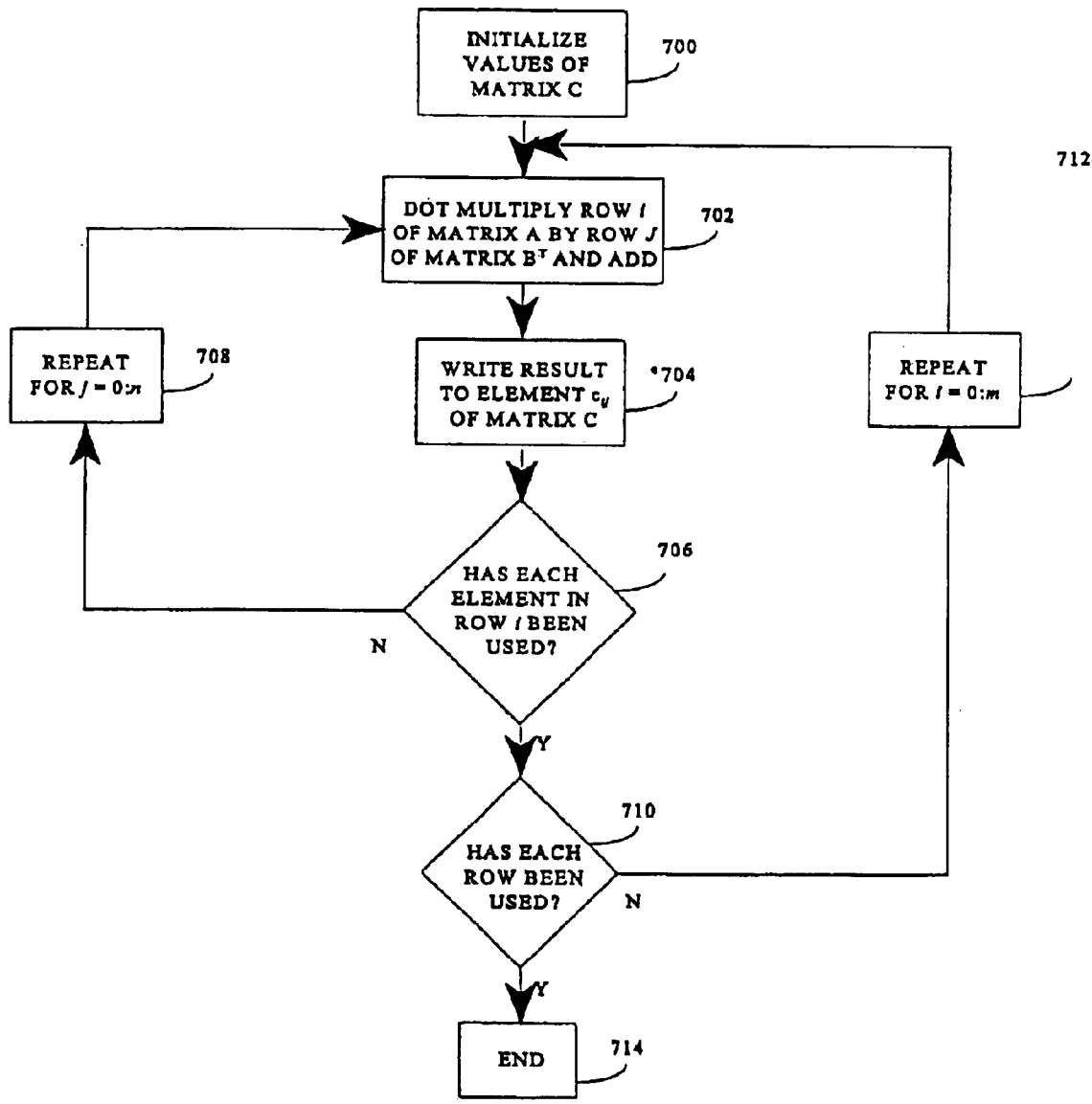
FIG. 7 is a flow diagram illustrating steps associated with conventional matrix multiplication.

The values of the solution matrix C, obtained in step 514 of FIG. 5, are calculated according to the flow diagram illustrated in FIG. 7. In FIG. 7, registers for storing values of matrix C are initialized (usually with zeroes) in step 700 and the dot product of row i of matrix A and row j of matrix $B^T$ is computed as shown in step 702. In step 704, the result of this calculation is summed with the value stored in the memory location for element $c_{ij}$ of matrix C, where i is the row of matrix A and j is the row of matrix $B^T$ used in the calculation. This multiplication and summation may occur in separate steps or in a single, fused operation within a vector processor. Then a determination is made in step 706 whether an element has been calculated for each value of j. If a product has not been calculated for each value of j, then, as shown in step 708, the previous two steps, steps 702 and 704, are repeated for each value of j from 0 to n, where n corresponds to the total number of columns contained within matrix $B_{ij}$ and consequently matrix C. If, however, an element has been calculated for each value of j, then a determination is made at step 710 as to whether an element has been calculated for each value of i. If a determination is made that an element has not been calculated for each value of i, then these calculations are repeated, as indicated in step 712, for each value of i from 0 to m, where m represents the total number of rows in matrix A, and consequently matrix C. On the other hand, if it is determined that an element has been calculated for each value of i, then the calculations are complete and the process is halted, as shown in step 714, and the product matrix C is complete.

As can be seen in FIGS. 5, 6 and 7, the prior approach to calculating products of matrices is inefficient, and requires many steps which could be eliminated if the full capabilities of the vector processor could be utilized without need for using the scalar processor, particularly the need to transpose a matrix.

To employ the advantages of a vector processing system, the present invention eliminates the need for manipulating matrix values to form a transpose matrix, and therefore does not require manipulation by the scalar processor. As a result, the speed and the efficiency with which such a product can be calculated is greatly increased. This is accomplished by computing partial products of the matrix elements.

Figure 8A:
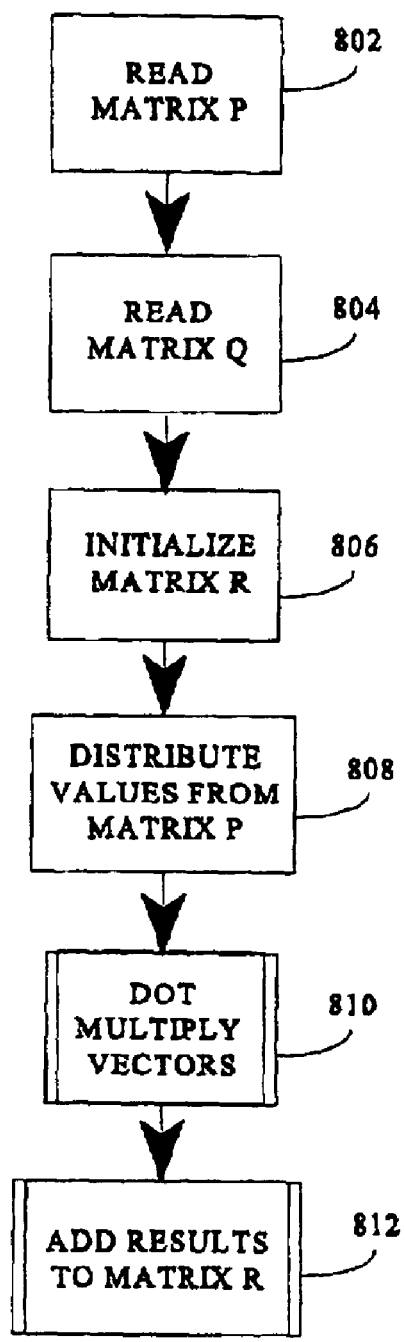
FIG. 8A is a flow diagram illustrating various steps used in performing matrix multiplication according to an embodiment of the present invention.
Figure 8B:
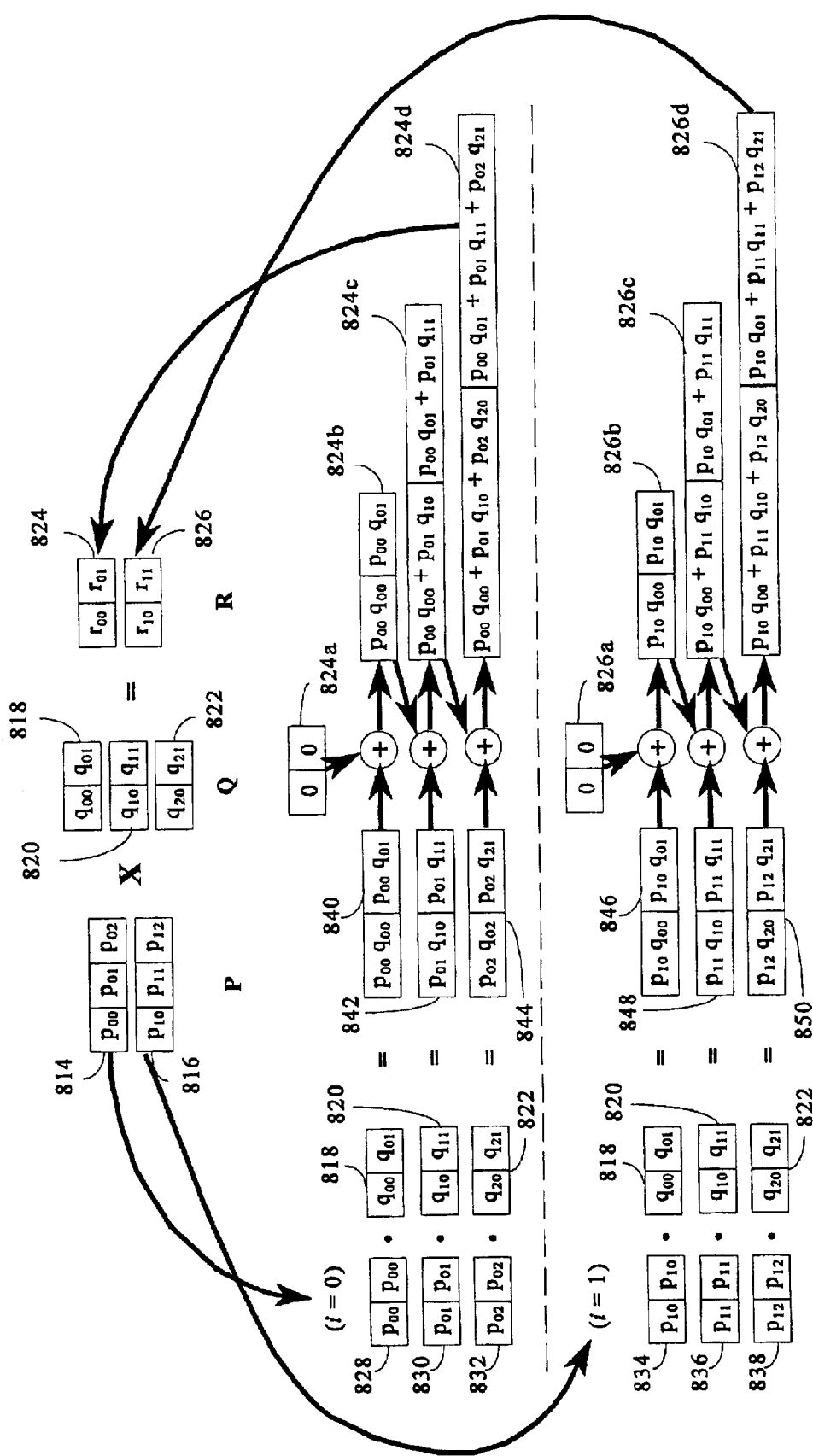
FIG. 8B is a block diagram of vector registers used in the manner shown in the flow diagram illustrated in FIG. 8A.

FIG. 8A is a flow chart which illustrates the basic steps associated with calculating a product of two matrices in accordance with an embodiment of the present invention. FIG. 8B is a block diagram of matrices stored in vector registers multiplied in the manner shown in the flow diagram illustrated in FIG. 8A. In FIGS. 8A and 8B two matrices, matrix P and matrix Q, are read by the vector processor in steps 802 and 804, respectively. A solution matrix, matrix R is initialized at step 806 using place-holding values, such as zeroes, to avoid erroneous values due to initialization problems. The solution matrix, matrix R, comprises multiple registers that make up a matrix having the equivalent number of rows as matrix P and the equivalent number of columns as matrix Q.

In FIG. 8B, the values of the elements of matrix P are stored in two vector registers 814, 816, which each contain values of a separate row of matrix P. The values of the elements of matrix Q are stored in three vector registers 818, 820, 822, which each contain values of an individual row of matrix Q. The values of the elements of the solution matrix R, are stored in two separate vector registers 824, 826, which each contain values of a row of matrix R. In the block diagram illustrated in FIG. 8B, a 2×3 matrix is multiplied by a 3×2 matrix to obtain a solution matrix which has the dimensions 2×2. These matrices, and their sizes, are used solely for purposes of illustration, and the techniques described in connection with the flow diagram of FIG. 8A may be used in connection with matrices of any size. As described in FIG. 8A, the two matrices are read by the processor in steps 802 and 804, and the registers containing the values of matrix R, namely registers 824 and 826, are initialized having the value zero, as illustrated by registers 824a, 826a.

In step 808, one or more vector registers is allocated, where the number of registers is determined by the number of rows in matrix Q. Each register formed in step 808 contains multiple copies of one of the elements of matrix P. The number of copies of each element of matrix P contained within each of the newly allocated registers is determined by the number of columns of matrix Q. Thus, if matrix P contains six elements arranged in a 2×3 matrix, having 2 rows and 3 columns, then in step 808 six registers are loaded, each containing two elements.

FIG. 8B shows a group of vector registers that are loaded as described in step 808 of FIG. 8A, which each contain values from matrix P. These vector registers 828, 830, 832, 834, 836, 838, are loaded by allocating as many vector registers as the number of elements of matrix P, and duplicating a single element of matrix P for each of these vector registers in all of the vector register locations. The number of values contained within each vector register formed is determined by the number of columns, or register values contained within each register, of matrix Q. Thus, each of the group of vector registers loaded in step 808 of FIG. 8A contains two duplicates of each element of matrix P, for a total of six registers 828, 830, 832, 834, 836, 838, each containing two copies of a corresponding element of matrix P. Therefore, the first register 828 contains two copies of the value of the first element $P_{00}$ of matrix P, the second register 830 contains two copies of the value of the second element $P_{01}$ of matrix P, and so forth until all values contained in matrix P are copied into registers 828, 830, 832, 834, 836, 838. This duplication of the element of matrix P can be carried out within the vector processor by means of a "permute" instruction, for example.

The values in the vector registers in step 808 are dot multiplied with the elements of matrix Q at step 810. First, vector registers containing the values of each of elements within the first row of matrix P are dot multiplied with values in each of the registers containing the rows of matrix Q in an ordered fashion. That is, the register 828 containing duplicate copies of the values of the first element $P_{00}$ of the first row of matrix P is dot multiplied with the register 818 containing the values of the elements of the first row of matrix Q to form a dot product. This resulting dot product 840 is then added to the locations in register 824 that corresponds to the first row of matrix R in step 812, as each of the values of the dot product retains its relative location, element index, or column location. This result is represented as intermediate value 824b in FIG. 8B. Each of the vectors containing the remaining elements of the first row of matrix P are likewise dot multiplied with the registers containing the remaining rows of matrix Q in an ordered fashion. Thus, the register 830 containing duplicate copies of the value of the second element $P_{01}$ of the first row of matrix P are dot multiplied with the register 820 containing the values of the second row of matrix Q, and the register 832 containing duplicate copies of the third element $P_{02}$ of the first row of matrix P is dot multiplied with the register 822 containing the value of the third row of matrix Q. The results of each of these dot multiplications using vector registers containing elements for the first row of matrix P are also added to the first row of the solution matrix R, producing intermediate result 824c and the final result 824d. Similar dot multiplication operations are performed using the registers 834, 836 and 838 containing elements from the second row of matrix P; however, the dot products obtained by dot multiplications using values from the second row of matrix P are added to register 826 corresponding to the second row of the solution matrix R. In larger matrices, this multiplication would continue in the same fashion, dot multiplying vector registers containing values of elements from the $n^{th}$ column of the first matrix by the registers containing the values of the $n^{th}$ row of the second matrix.

Once all of the calculations have been completed and each of the dot products has been added to registers 824 and 826, matrix R then contains a complete solution to the matrix multiplication, that is it contains the product of matrix P and matrix Q. This solution, by way of the method of the present invention is carried out without the need for transposing either of the matrices used in the operation, and takes advantage of the vector processor's capability to perform calculations upon entire vector registers simultaneously. The method of the present invention is further advantageous when used in connection with a "fused" operation that allows for multiplication and addition of vector registers simultaneously, so that the dot products of two registers can be added to the product matrix during the same clock cycle as the dot multiplication operation.

In other words, the fused multiply-and-add operation combines steps 810 and 812 of FIG. 8A into a single step. Alternatively, this addition may be carried out in a step that is separate from that of forming individual dot product vectors, which are subsequently added to the solution. Either way, the result is the same and more efficient than the prior techniques.

In FIG. 8B, intermediate dot product vectors 840, 842, 844, 846, 848, 850 are shown to illustrate the computation of the dot products obtained from the dot multiplication of the vector registers 828, 830, 832, 834, 836, 838 with the vector registers 818, 820, 822 containing the values of the elements of matrix Q. These dot product vectors are shown as being added to the vector registers 824, 826 containing the values of elements of matrix R. However, those skilled in the art will appreciate that using the "fused" multiplication and addition function, the dot product obtained from the dot multiplication would be immediately added to the vector registers 824 and 826 containing the values of matrix R, without the need for any intermediate storage in separate registers.

It should be noted, that although an order may be inferred from the letters associated with the solution vector registers 824a, 824b, 824c, 824d, and 826a, 826b, 826c, 826d, the timing order in which the partial products are added to the solution vector register is unimportant, as the computational order is preserved. As shown in FIG. 8B, the initialized vector values 824a, 826a, which are initialized with the values of zero for each element, are increased by the amount of partial products represented by vector registers 840, 842, 844, 846, 848, 850. Upon the addition of each of these partial product vectors, the final solution vector registers 824, 826 are obtained, which in the case illustrated in FIG. 8B is equivalent to vector registers 824d, 826d, respectively.

As previously discussed, this process is advantageous over methods heretofore known, as previous methods required transposition and manipulation of each element of matrix Q, which often requires the use of a scalar processor in addition to the vector processor, thereby requiring more clock cycles to form the same calculation. Additionally, the method illustrated in FIGS. 8A and 8B is more efficient than the methods previously known, as all of the calculations involve vector operations on registers, and can be handled within the vector processor without requiring processing in the scalar processor, thereby utilizing the full capabilities and advantages of the vector processor and greatly increasing the speed at which the product of matrices may be calculated. As previously discussed, if the "fused" multiplication/addition operation is used, whereby a multiplication and addition of a vector register is accomplished on a single clock cycle, additional time can be saved by using a vector processor. It will be recognized by those skilled in the art that while the example set forth in FIG. 8B utilizes matrices of specific sizes, the concepts contained therein may be extended to matrices of varying sizes with similar results and advantages. Therefore, the method of the present invention may be advantageously used to compute the product of matrices of all sizes in vector processing systems with increased computational efficiency.

Figure 9:
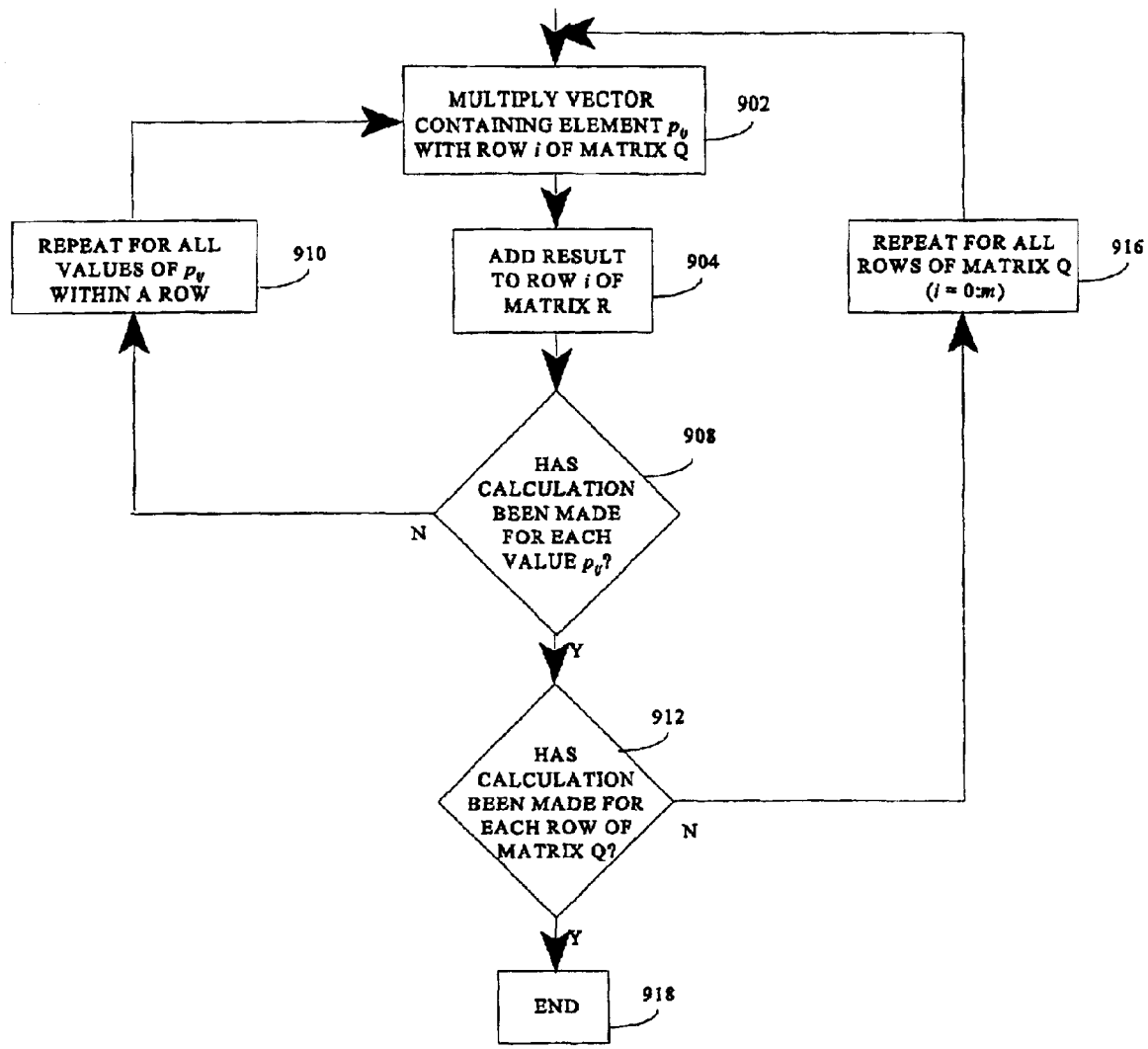
FIG. 9 is a flow diagram illustrating various steps associated with performing matrix multiplication according to an embodiment of the present invention.

FIG. 9 illustrates the method by which a product matrix R is calculated in more detail, and corresponds to steps 810 and 812 of FIG. 8A. In step 902, a vector containing copies of the values of element $p_{ij}$ from a first matrix, P, and having a number of elements corresponding to the number of columns of a second matrix, Q, is multiplied with row i of matrix Q and added to row i of matrix R, as shown in step 904, with each element retaining its index value, or position. A decision is made at step 908 as to whether vector registers containing each value of matrix P, for the current row, has been multiplied by the rows of matrix Q. If it is determined at step 908 that the aforedescribed calculations have not been carried out for vector registers containing each value of matrix P, within the current row, then steps 902 and 904 are repeated for all values $p_{ij}$ of matrix P on step 910. A decision is made in step 908 as to whether this calculation has been carried out for all rows of matrix Q. If it is determined at step 908 that this is not the case, then, as indicated in step 916, steps 902, 904, and 908 are repeated for all rows of matrix Q. This means that the value of i must be varied from 0 to m, where m corresponds to the total number of rows in max Q. If, however, it is determined in step 912 that these calculations have been carried out for each row of matrix Q, then the procedure is terminated, as indicated in step 918.

In each of the previous examples, the matrices being multiplied have been of a size small enough that each of the rows of the matrices could be read into a single register, and calculations could be performed using each entire row. As previously discussed, an exemplary size for a register is 128 bits, in which case one register can hold four 32-bit floating point numbers. Thus, in accordance with an embodiment of the present invention, wherein 32-bit floating point numbers are used, each row of a 4×4 matrix can be stored in one register and the techniques of the present invention apply without modification. However, the same principles of the present invention associated with calculating the product of two matrices using partial products, as described above, can be extended to matrices of greater sizes. Such matrices may be so large that their rows cannot be contained within a single register. In such cases, the product of the two matrices may be determined by treating each matrix as a series of smaller matrices. In this manner, for example, any large matrix may be divided into 4×4 submatrices in accordance with an embodiment of the present invention, or submatrices of other sizes.

Figure 10:
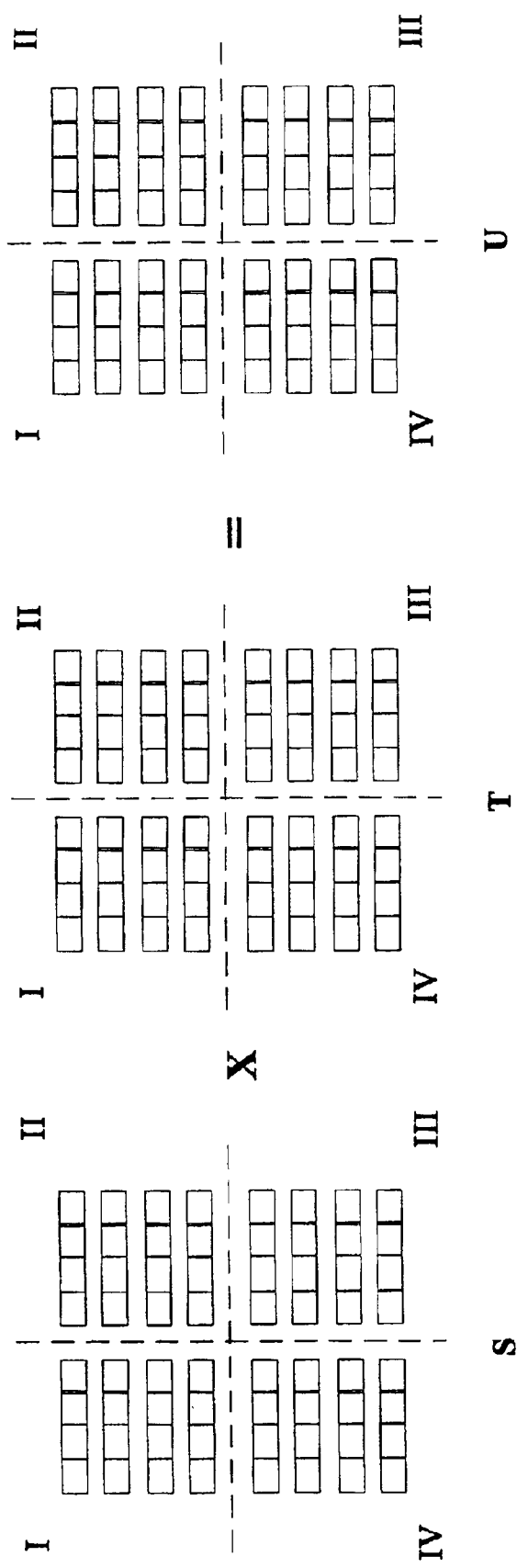
FIG. 10 is an illustration of vector registers used to perform matrix multiplication according to one embodiment of the present invention.

One such example is illustrated in FIG. 10, wherein two matrices, matrix S and matrix T, are multiplied to obtain a product matrix U. Each of the matrices illustrated in FIG. 10 have 8 rows and 8 columns. However, as indicated above, these 8×8 matrices can each be divided into 4×4 matrices. Each sub-matrix has 4 rows and 4 columns and occupies a quadrant of the entire matrix. The quadrants are indicated by Roman numeral designations I–IV.

The values of the product matrix U in FIG. 10 are determined in a similar manner described above in connection with FIGS. 8A and 8B by determining a series of partial products. Once each of these partial products are summed, the overall values of the product matrix are obtained. In order to understand how this overall multiplication is accomplished by dividing each of the matrices S and T into sub-matrices, a general description of how such multiplication would be carried out using the partial products technique described above without dividing each of the matrices into sub-matrices is provided first.

As previously described, in obtaining a product matrix, such as matrix U, by partial products, each value of each row of matrix S is individually read into a vector register and copied into a number of positions of that register which is the same as the number of columns of matrix T. Thus, the first vector register contains 4 copies of the first value $s_{00}$ of matrix S. This vector register is then multiplied in a dot product fashion with the first row of matrix T. These values are then added to the first row of the product matrix U, retaining the same order, or index value. The second vector register contains multiple copies of the second value of the first row of matrix S and is multiplied by the second row of matrix T in a dot product fashion, and the results are added to the first row of matrix U. This is continued until registers made up of all of the values of the first row (i=0) and each subsequent row (i=1:7) of matrix S are dot multiplied by the rows of matrix T whose row number corresponds to the column number of the element from matrix S. The partial products are then added to the solution matrix U, in the rows corresponding to the row number of matrix S from which the elements were copied.

However, an alternative technique exists using the submatrices defined by each quadrant of matrix S and matrix T, to determine the values of the matrix U in parts by partial products. For example, the first value $s_{00}$ of matrix S may be copied into a register containing four values and dot multiplied with the first four values of the first row of matrix T, i.e. the first row of the sub-matrix contained within quadrant I of matrix T. The resulting dot product may be then added to the first four values of the first row of matrix U, or the first row of sub-matrix I of matrix U. Calculations may continue in this manner between sub-matrix I of matrix S and submatrix I of matrix T to produce partial products which may be added to submatrix I of matrix U. In addition, similar calculations are carried out between submatrix I of matrix S and sub-matrix II of matrix T to calculate the partial products to be added to sub-matrix II of matrix U. The vector registers containing values within sub-matrix II of matrix S are multiplied by the registers of submatrices m and IV of matrix T, which contain values of the fifth through eighth rows of matrix T (i=4:7). The partial products obtained by these dot multiplication calculations are added to the solution matrix U in submatrices III and IV, while maintaining their positions, or indices, relative to matrix T. In the same manner, vectors created from the values contained within submatrix III of matrix S are dot multiplied with the registers in submatrices III and IV, of matrix T that correspond to the same row number within matrix T as the column number of matrix S from which the element creating the vector is copied. Likewise, vectors created from the values contained in submatrix IV are dot multiplied with the registers in submatrices I and II of matrix T in the same manner.

Figure 11:
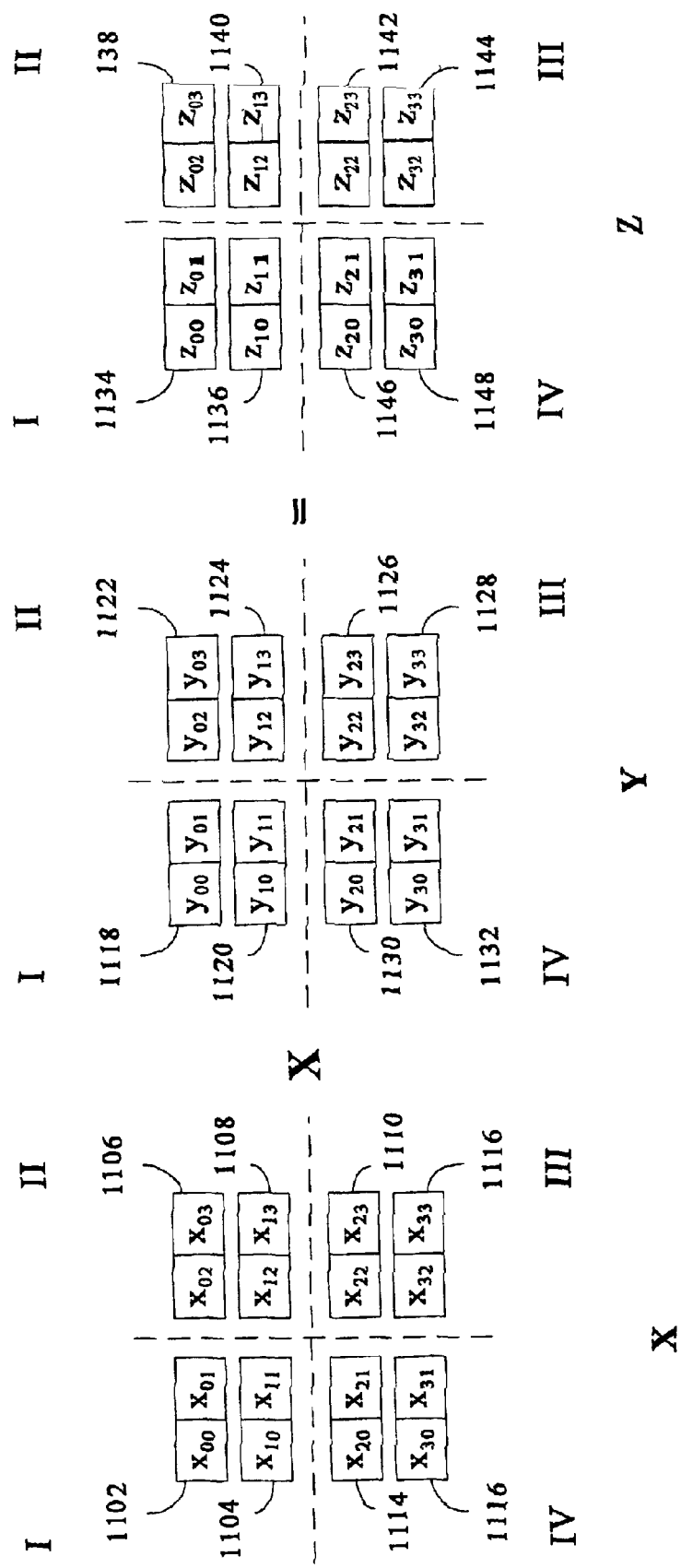
FIG. 11 is a block diagram illustrating matrices that are multiplied according to one embodiment of the present invention.

An example of multiplication of matrices using submatrices is illustrated in FIG. 11 wherein matrix X is multiplied by matrix Y to calculate the product matrix Z. For the sake of simplification, each of the matrices shown is a 4×4 matrix, which is divided into a smaller 2×2 submatrices. However, it will be recognized by those skilled in the art that the same technique may be used with submatrices of any size whose elements can be contained in a single register. For example, in accordance with an embodiment of the present invention, the submatrices may be 4×4 submatrices of larger matrices to be multiplied.

The submatrices of each matrix occupy individual quadrants, each of which are labeled in FIG. 11 with roman numerals I–IV. The elements of each matrix are designated in a similar manner as elements of matrices described previously, such as the matrices illustrated in FIGS. 3, 4, and 8B. The techniques associated with calculating the product of matrix X and matrix Y may also be extended to larger matrices having larger submatrices and/or having submatrices contained in registers which have more elements. For example, in one embodiment of the present invention, registers holding four 32-bit floating point numbers may be used as the smallest building block for matrices and submatrices. Thus, each of the submatrices would be made up of 128-bit registers holding four elements. It will be appreciated by those skilled in the art, however, that multiple numbers of elements could be used within a single register to achieve varying results and need not be calculated by the exemplary registers holding two elements, as set forth in FIG. 11, or the exemplary registers holding four elements each, as set forth in FIG. 10, for example.

In FIG. 11, submatrix I is stored in two registers 1102, 1104, as are each of the other submatrices II–IV, which are stored in registers 1106, 1108, 1110, 1112, 1114, 1116. Thus, as matrix X is divided into submatrices, each row is contained within two registers. For example, the first row of matrix X (i=0) is stored in two registers 1102, 1106, which are contained within two submatrices, submatrix I and submatrix II. Likewise, matrix Y and matrix Z are also subdivided into four submatrices each, which are labeled with Roman numerals I–IV. Matrix Y is made up of multiple registers 1118, 1120, 1122, 1124, 1126, 1128, 1130, 1132, each of which are contained within the various submatrices of matrix Y. Also, matrix Z is made up of multiple registers 1134, 1136, 1138, 1140, 1142, 1144, 1146, 1148, each of which form the various submatrices I–IV of matrix Z.

As discussed previously in connection with FIG. 10, in order to obtain the results stored as matrix Z, vectors formed from the various submatrices of matrix X must be multiplied by vectors forming multiple submatrices of matrix Y. For example, in order to obtain the complete first row of matrix Z, which is stored in vector registers 1134 and 1138, it is necessary to form vectors using multiple copies of the values contained within the entire first row of matrix X, which is contained within two separate registers of two distinct submatrices within matrix X, namely vector register 1102 and 1106. The vectors formed by duplicating the elements contained within vector register 1102, of the first row of matrix X, are dot multiplied with the vector registers containing the first two rows of matrix Y, namely vector registers 1118, 1120, 1122, and 1124. The results yielded by this dot multiplication are then added to the first row of matrix Z, specifically to vector registers 1134 and 1138. However, the calculation of the first row of matrix Z which is stored in vector registers 1134 and 1138, is not complete after these calculations. Rather, further calculations using vector register 1106 of submatrix II of matrix X must be performed. Specifically, vector registers formed using the elements stored in vector register 1106 must be dot multiplied with vector registers of submatrices III and IV of matrix Y which are contained in vector registers 1126, 1128, 1130, 1132 and the resulting dot product is then added to vector registers 1134 and 1138. Only after all of these calculations is the first row of matrix Z completely calculated. Similarly, equivalent calculations using each of the vector registers of matrix X must be carried out.

FIGS. 11A, 11B, 11C, and 11D depict in greater detail how these calculations use submatrices to compute partial products, and arrive at a final matrix product. FIGS. 11A–11D depict calculations using the various submatrices of matrix X, submatrices I–IV, respectively.

Figure 11A:
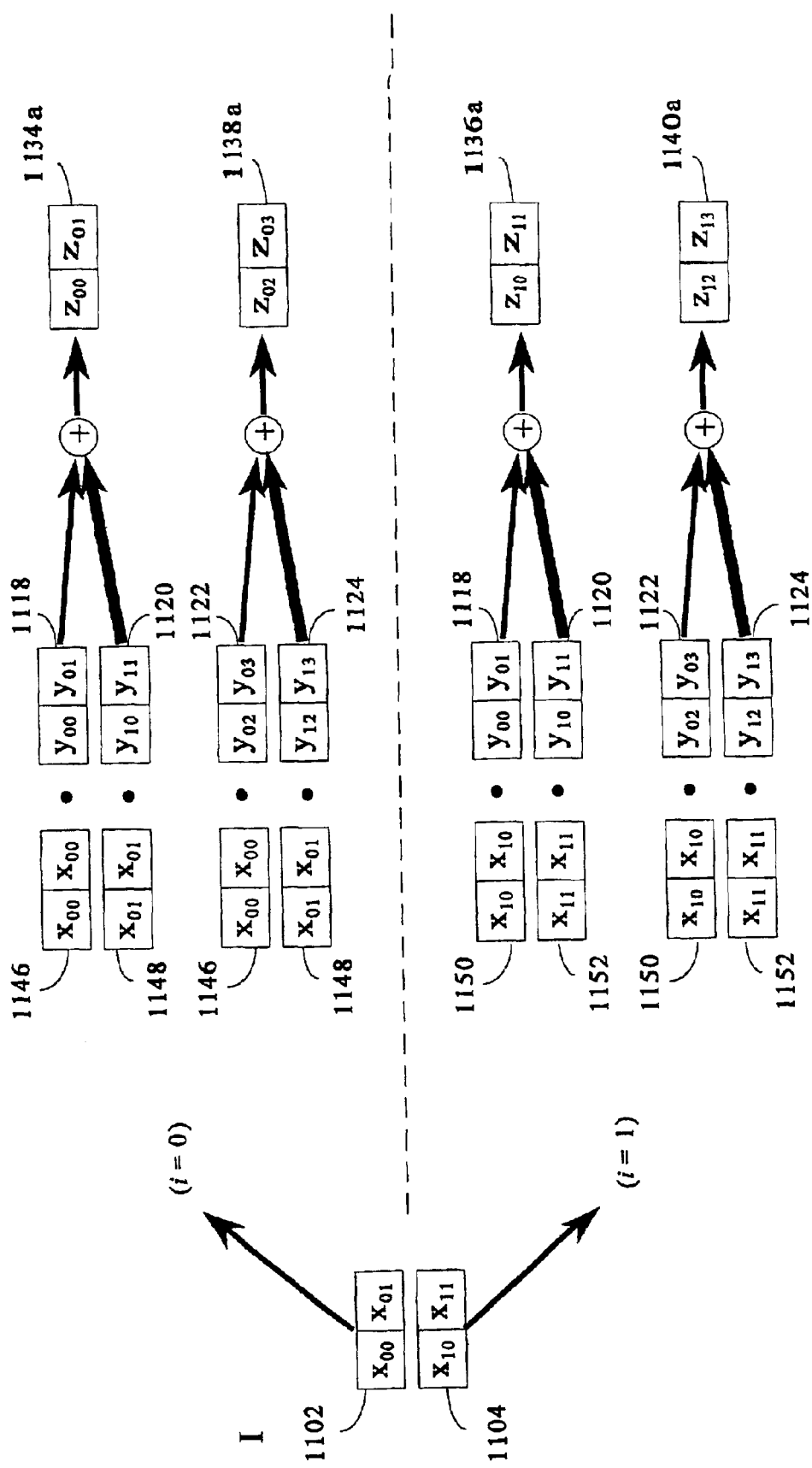
FIG. 11A is a block diagram of a portion of the matrix multiplication of the matrices of FIG. 11.

In FIG. 11A, calculations using the first submatrix of matrix X, submatrix I, are shown. Submatrix I is made up of values stored in vector registers 1102 and 1104. Calculations using values from the first row (i=0) of matrix X, or from vector register 1102, are used to calculate the product values stored in the first row of the solution matrix, matrix Z. Likewise, calculations using values from vector register 1104, which is taken from the second row (i=1) of matrix X are used to determine the values to be stored in the second row of matrix Z. As with calculations described in connection with FIGS. 8A and 8B, the first step of performing the partial product multiplication illustrated in FIG. 11A is to load vector registers with multiple copies of each value contained in each of the vector registers in which the rows of submatrix I are stored. Thus, vector registers 1146 and 1148 contain duplicate copies of the values contained within vector register 1102. These vector registers 1146, 1148 are dot multiplied with the vector registers containing the first two rows of matrix Y, specifically vector registers 1118, 1120, 1122, 1124. The results are summed, maintaining each element's index the same, and added to the first row of matrix Z, which is stored in vector registers 1134 and 1138 in the manner illustrated. That is, products obtained using the vector registers of submatrix I of matrix Y are added to the vector registers of submatrix I of matrix Z, and products obtained by using vector registers of submatrix II are added to the vector registers of submatrix II of matrix Z.

In FIG. 11A, the vectors 1134a, 1138a, and 1136a, 1140a are given the letter designation "a" to indicate that the values contained therein are not necessarily equivalent to the values of vector registers 1134, 1138, and 1136, 1140, as they appear in their final form in the product matrix Z. This is because only part of the calculations necessary to obtain the final products stored in these registers have been performed.

Vector registers 1150, 1152 are loaded with the elements from vector register 1104 of the second row of matrix X and are dot multiplied with the vector registers from the first two rows of matrix Y 1118, 1120, 1122, 1124. The dot products obtained are then added to the second row of matrix Z (i=1) contained within vector registers 1136, 1140 in the manner illustrated in FIG. 11A.

Figure 11B:
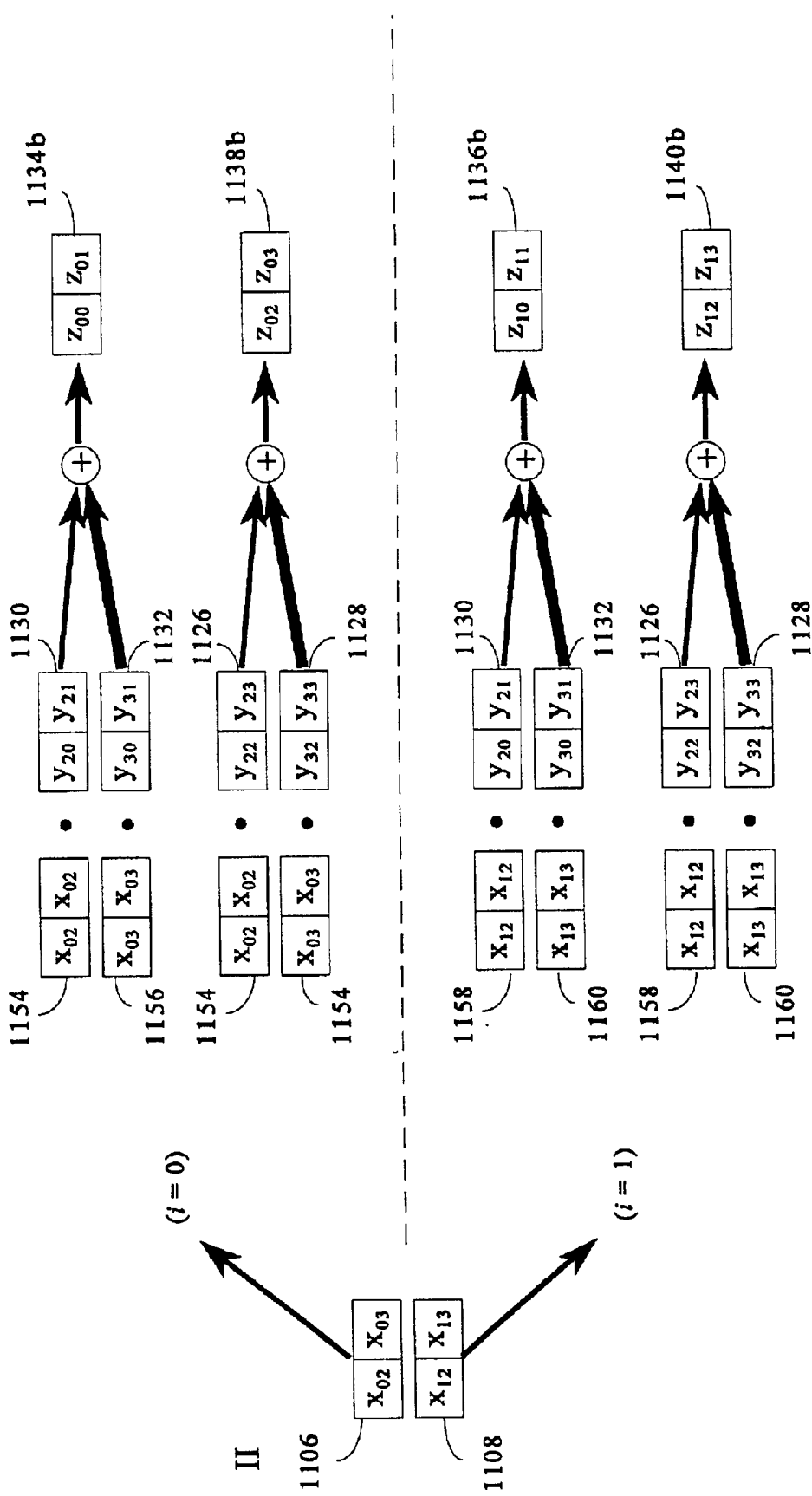
FIG. 11B is a block diagram of a portion of the matrix multiplication of the matrices of FIG. 11.

In FIG. 11B, calculations using submatrix II of matrix X are performed in a similar manner, as the vector registers are loaded with values from the vector registers 1106, 1108 of submatrix II, and are dot multiplied with vector registers containing the third and fourth rows of matrix Y. The vector registers 1154, 1156, 1158, 1160 are multiplied by the vector registers 1130, 1132, 1126, 1128 of submatrices m and IV of matrix Y and are added to the first two rows of matrix Z, contained in vector registers 1134, 1138, 1136, 1140. These vectors are shown with the designation "b" to indicate that a second dot product has been added to vector registers 1134, 1136, 1138, 1140, and in this case are equivalent to the final vector registers contained within the product matrix Z, as all of the calculations necessary to compute the values contained within these registers have been performed. However, in cases using larger matrices, more calculations may need to be performed to achieve values equivalent to the values of the final product.

Figure 11C:
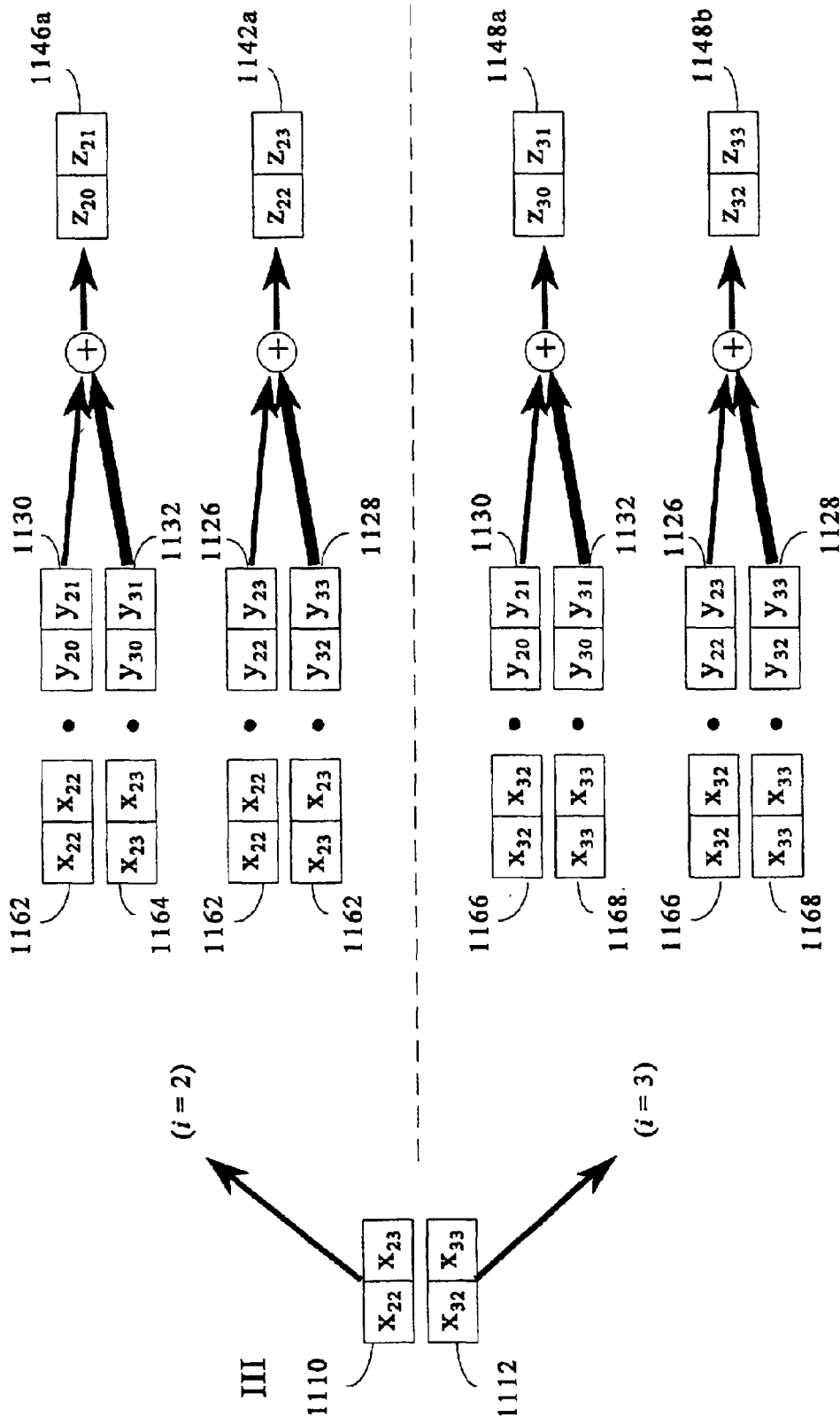
FIG. 11C is a block diagram of a portion of the matrix multiplication of the matrices of FIG. 11.

FIG. 11C illustrates the same calculations for submatrix III of matrix X, wherein vector registers 1162, 1164, 1166, 1168 are loaded with the values of vector registers 1110, 1112, respectively. These values are then dot multiplied with the third and fourth rows of matrix Y, which are contained within vector registers 1130, 1132, 1126, 1128 to obtain dot products which are added to the vector registers comprising the second and third rows of matrix Z, specifically vector registers 1146, 1142, 1148, 1144. As before, the designation "a" is used to illustrate that only the first of the calculations necessary to be performed with respect to these vector registers have been completed.

Figure 11D:
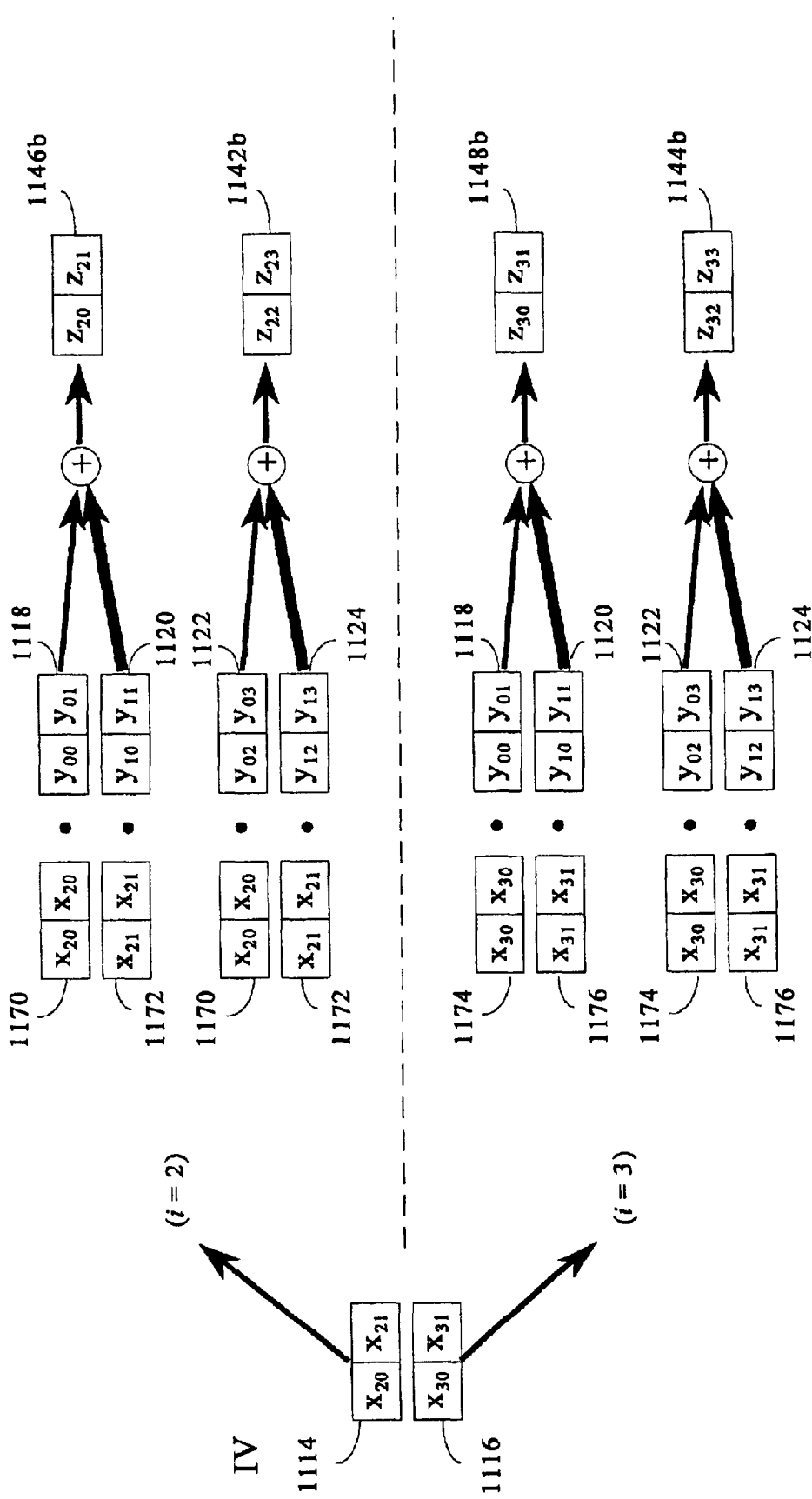
FIG. 11D is a block diagram of a portion of the matrix multiplication of the matrices of FIG. 11.

In FIG. 11D, the operation on submatrix IV of matrix X, which is stored in vector registers 1114 and 1116 is illustrated. Vector registers 1170, 1172, 1174, 1176 contain duplicate copies of elements from vector registers 1114, 1116. These vector registers have been dot multiplied with the first two rows of matrix Y, which are contained in vector registers 1118, 1120, 1122, 1124, to obtain values that are then added to vector registers comprising the second and third rows of matrix Z. Specifically, values are added to vector registers 1146, 1142, 1148, 1144 and are given the designation "b," indicating that two calculations have been added to these registers, which is the total number of calculations required in this case to achieve the final values to be stored in these registers.

It can be seen by those skilled in the an that the partial products described in the context of the present invention may be used to determine the product of large matrices by dividing these large matrices into smaller, more convenient submatrices, as shown in FIGS. 10, 11, 11A, 11B, 11C, and 11D, for example. Additionally, matrices much larger than those shown in FIGS. 10, 11, and 11A–D may be multiplied by way of the partial product method described herein either directly, or by using a greater number of submatrices.

The calculation of the values in a product matrix has been described as the multiplication, or dot product of vector registers, and the summation of elements from the dot product of registers with elements of the product matrix row having equivalent indices. The partial products formed by way of the present invention are advantageous in that they allow for rapid computation of the product of two matrices in a significantly reduced time without requiring matrix transposition, or other scalar processing.

It will be appreciated by those of ordinary skill in the art that the present invention can be embodied in other specific forms without departing from the spirit or essential characteristics thereof. The presently disclosed embodiments are, therefore, considered in all respects to be illusive and not restrictive. The scope of the invention is indicated by the appended claims, rather than the foregoing description, and all changes that come within the meaning and range of equivalents thereof are intended to be embraced therein.

What is claimed is:

1. A method for efficiently performing matrix multiplication in a vector processing computer system by using partial products that is bit-by-bit compatible with conventional matrix multiplication techniques, wherein two matrices are stored in vector registers within the computer system, comprising the steps of:

storing values within a first group of vector registers within a vector processor that each comprise multiple copies of a respective individual value of a first matrix to be multiplied;

storing values within a second group of vector registers within a vector processor that each comprise values from a respective row of a second matrix to be multiplied;

dot multiplying each of said first vector registers having values from a single row of said first matrix by each of said second vector registers;

adding the values obtained by said step of multiplying to a third group of vector registers corresponding to a product matrix; and repeating said steps of multiplying and adding, for said first vector registers having values from every row of said first matrix.

2. The method of claim 1, wherein said step of multiplying is carried out in a manner such that vector registers containing multiple copies of each value from a single row are each multiplied by vector registers from a second group of vector registers from row numbers corresponding to the element number from which the elements contained within the first group of vector registers is taken.

3. The method of claim 1, wherein said step of adding is carried out such that the values obtained by dot multiplying vector registers from the first group of vector registers having values from a single row are added to the third group of vector registers corresponding to the product matrix in such a manner that the vector registers obtained correspond to the same row of the product matrix as the row from which their values were taken from said first matrix.

4. A system for efficiently performing matrix multiplication in a vector processing computer system by using partial products that produces a bit-by-bit compatible result with conventional matrix multiplication techniques, wherein values of two matrices are stored in vector registers within the computer system, comprising the steps of:

means for storing values within a first group of vector registers within a vector processor that each comprise multiple copies of each individual value of a first matrix to be multiplied;

means for storing values within a second group of vector registers within a vector processor that each comprise values from each row of a second matrix to be multiplied;

means for dot multiplying each of said first vector registers having values from a single row of said first matrix by each of said second vector registers; and means for adding the values obtained by said step of multiplying to a third group of vector registers corresponding to a product matrix.

5. The system of claim 4, wherein said means for dot multiplying is configured to perform the multiplication in a manner such that vector registers containing multiple copies of each value from a single row are each multiplied by vector registers from a second group of vector registers from row numbers corresponding to the element number from which the elements contained within the first group of vector registers is taken.

6. The system of claim 4, wherein said means for adding is configured to multiply in a manner such that the values obtained by dot multiplying vector registers from the first group of vector registers having values from a single row are added to the third group of vector registers corresponding to the product matrix in such a manner that the vector registers obtained correspond to the same row of the product matrix as the row from which their values were taken from said matrix.

7. A method for multiplying two matrices that is bit-by-bit compatible with conventional matrix multiplication techniques in a vector processor, comprising the steps of:

(i) replicating the value of each element of a first matrix to form corresponding vectors each having a number of elements corresponding to the number of columns in a second matrix, and storing said vectors in a first set of registers;

(ii) storing the value of the elements of each row of said second matrix as corresponding vectors in a second set of registers;

(iii) multiplying a vector in one of said first set of registers with a vector in one of said second set of registers such that the vector in one of the first set of registers multiplied with a vector in one of the second set of registers is selected from a single row within the first matrix, and adding the resulting products as a vector in one of a set of third registers corresponding to the rows of a product matrix equivalent to the row from which the element stored in the vector of the first set of registers is taken; and (iv) iteratively repeating step (iii) for each vector in said first set of registers.

8. The method of claim 7, wherein step (iii) comprises multiplying a vector whose values are elements contained in a given row of the first matrix with a vector containing values of elements contained in the corresponding row of the second matrix.

9. The method of claim 8, wherein the resulting product is stored in one of said third set of registers which corresponds to said given row in a third matrix.

10. A method for efficiently calculating the product of a first matrix and a second matrix in a vector processing system that is bit-by-bit compatible with conventional matrix multiplication techniques, wherein said first matrix is stored in a plurality of first vector registers, and wherein said second matrix is stored in a plurality of second vector registers, and wherein each of said first plurality of vector registers corresponds to an individual row of said first matrix, and each of said second plurality of vector registers corresponds to an individual row of said second matrix, comprising the steps of:

(1) selecting a vector register corresponding to a row of said first matrix;

(2) storing multiple copies of a single value from the register selected in step 1 in a vector register and wherein the single value selected from the vector register selected in step 1 has a specific index within the vector register selected in step 1;

(3) calculating the dot product of the vector register containing multiple copies of a single value that was stored in step 2 and the vector register containing elements from the row number of the second matrix which corresponds to the index of the element stored within the vector register in step 2;

(4) adding the dot product calculated in step 3 in one of a third group of vector registers that form a third matrix, which is the product of the first two matrices, by adding the dot product value in the register corresponding to the row of the product matrix that is equivalent to the row of the first matrix that corresponds to the vector register selected in step 1;

(5) repeating steps 2 through 4 for each of the elements contained within the register selected in step 1; and (6) repeating steps 1 through 5 for each of the registers corresponding to each row of the first matrix.

11. The method of claim 10, wherein said step of storing multiple copies of a single value from the register selected in step 1 further comprises storing the multiple copies in a vector register having the same number of elements as the number of elements of each row of said second matrix.

12. The method of claim 10, wherein said third group of vector registers corresponding to a third matrix, or product matrix, is initialized by storing initial values of each element within the third group of vector registers.

13. The method of claim 12, wherein said initialization occurs by storing the value zero in each location of each vector of said third group of vector registers.

14. A method for efficiently calculating the product of a first matrix and a second matrix in a vector processing system that is bit-by-bit compatible with conventional matrix multiplication techniques, wherein said first matrix is stored in a plurality of first vector registers, and wherein said second matrix is stored in a plurality of second vector registers, comprising the steps of:

(i) dividing each of said first and second matrices into a plurality of submatrices;

(ii) assigning values of each submatrix associated with said first and second matrices to said pluralities of first and second vector registers, respectively, in a manner such that each of said first plurality of vector registers corresponds to an individual row of a submatrix of said first matrix, and each of said second plurality of vector registers corresponds to an individual row of a submatrix of said second matrix;

(iii) selecting a vector register corresponding to a row of a submatrix of said first matrix;

(iv) storing multiple copies of a single value from the register selected in step (iii) in a vector register, and wherein the single value selected from the vector register selected in step (iii) has a specific index within the vector register selected in step (iii);

(v) calculating the dot product of the vector register containing multiple copies of a single value that was stored in step (iv) and the vector register containing elements from the row number of each submatrix of the second matrix which corresponds to the index of the element stored within the vector register in step (iv);

(vi) adding the dot product calculated in step (v) to one of a third group of vector registers that form a third matrix, which is the product of the first two matrices, by adding the dot product value in the register corresponding to the row of the submatrix within the product matrix that is equivalent to the row of the first matrix that corresponds to the vector register selected in step (iii);

(vii) repeating steps (iv–vi) for each of the elements contained within the register selected in step (i); and (viii) repeating steps (iii–vii) for each of the registers corresponding to each row of each submatrix of the first matrix.

15. The method of claim 14 wherein said step of storing multiple copies of the single value from the register selected in step (iii) in a vector register further comprises storing the multiple copies in a vector register having the same number of elements as the number of elements of each row of each submatrix of the second matrix with which it is multiplied.

16. The method of claim 14 wherein said third group of vector registers corresponding to a third matrix, or product matrix, is initialized by storing the initial values of each element within the third group of vector registers.

17. The method of claim 16 wherein said initialization occurs by storing the value zero in each location of each vector of said third group of vector registers.

18. The method of claim 14 wherein said steps of calculating and adding are performed simultaneously by way of an integrated vector processing function.

* * * * *